US 6,643,048 B2

(12) United States Patent
Gopalakrishnan et al.

(10) Patent No.: US 6,643,048 B2
(45) Date of Patent: *Nov. 4, 2003

(54) LOW-LOSS ELECTRODE STRUCTURES USING RESISTIVE CONNECTIONS FOR OPTICAL MODULATION APPLICATIONS

(75) Inventors: Ganesh K. Gopalakrishnan, Bethesda, MD (US); Kevin G. Donovan, Baltimore, MD (US); Richard C. Blanchard, Columbia, MD (US)

(73) Assignee: Codeon Corporation, Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/885,136

(22) Filed: Jun. 21, 2001

(65) Prior Publication Data

US 2002/0054417 A1 May 9, 2002

Related U.S. Application Data

(63) Continuation-in-part of application No. 09/778,712, filed on Feb. 8, 2001, now Pat. No. 6,429,959.
(60) Provisional application No. 60/245,207, filed on Nov. 3, 2000.

(51) Int. Cl.$^7$ ............................... G02F 1/03; G02F 1/07
(52) U.S. Cl. ....................................... 359/254; 359/248
(58) Field of Search ................................ 359/254, 276, 359/279, 245–48; 385/2, 8, 131

(56) References Cited

U.S. PATENT DOCUMENTS

| 5,436,195 | A | * | 7/1995 | Kimura et al. ............... 437/129 |
| 5,687,272 | A | * | 11/1997 | Vinchant et al. ............ 385/131 |
| 6,033,126 | A | | 3/2000 | Omori et al. ................. 385/88 |
| 6,334,008 | B2 | * | 12/2001 | Nakabayashi ................ 385/14 |
| 6,343,163 | B1 | * | 1/2002 | Kawanishi ..................... 385/2 |
| 6,429,959 | B1 | * | 8/2002 | Gopalakrishnan et al. .. 359/254 |
| 2002/0109895 | A1 | * | 8/2002 | Gopalakrishnan ........... 359/237 |

FOREIGN PATENT DOCUMENTS

JP          10239648          9/1998     ........... G02F/1/035

* cited by examiner

Primary Examiner—Jordan M. Schwartz
Assistant Examiner—Jessica Stultz
(74) Attorney, Agent, or Firm—Morgan Lewis & Bockius LLP

(57) ABSTRACT

An optical device includes a grounded base and an optical modulator chip having a top surface, a back surface and side surfaces. The optical modulator chip is positioned on the grounded base with the back surface facing the grounded base. The optical modulator chip includes a first ground electrode, a signal electrode and a second ground electrode located over the top surface of the optical modulator chip. The first and second ground electrodes of the optical modulator chip are interconnected with resistive layers on a surface of the optical modulator chip.

35 Claims, 8 Drawing Sheets

LOW-LOSS ELECTRODE STRUCTURES USING RESISTIVE CONNECTIONS FOR OPTICAL MODULATION APPLICATIONS

This application is a Continuation-In-Part of application Ser. No. 09/778,712 filed Feb. 8, 2001, now U.S. Pat. No. 6,429,959, which hereby incorporated by reference. In addition, this application claims the benefit of provisional application Ser. No. 60/245,207 filed Nov. 3, 2000, which is hereby incorporated by reference.

BACKGROUND OF THE INVENTION

1. Field of the Invention

The present invention relates to an optical modulation system, and more particularly, to the interconnection of external electrodes to an optical modulator so as to minimize loss of signal energy and to prevent the introduction of spurious modes into the signal within the optical modulator.

2. Discussion of the Related Art

In a general fiber optical communication system, optical signals are sent along an optical fiber communication line to a desired location. Optical modulators with performance in the 40 GHz frequency range and beyond, are critical components in optical communication systems.

To achieve high-frequency operation in a material such as LiNbO$_3$, the electrical and optical velocity of the modulating and modulated signal must be matched. This is achieved by employing thick (>10 $\mu$m) electrodes in conjunction with a buffer layer (typically SiO$_2$). The buffer layer is deposited directly on the LiNbO$_3$ and the electrode structure is delineated on the buffer layer. While the buffer layer facilitates velocity matching, it also results in decreased modulation efficiency because the applied voltage is partially dropped across the buffer layer. LiNbO$_3$ is an anisotropic material, with the following dielectric constants:

$$\epsilon_{extra\text{-}ordinary}=26, \epsilon_{ordinary}=43$$

Thus, planar and uni-planar transmission lines such as microstrip, coplanar waveguide (CPW) and coplanar strip (CPS) tend to be very dispersive when built directly on LiNbO$_3$. As the frequency increases, the fields become more concentrated in the regions below the metal strips, where the substrate permittivity has already resulted in a relatively larger electric displacement since the fields are forced into the LiNbO$_3$ to an increasing extent as the frequency increases. Therefore, a frequency-dependent effective permittivity can be defined for the transmission line.

FIG. 1 illustrates an optical modulator of the prior art. The modulator has a mounting base 1 that is typically conductive or made of a non-conductive material covered with a conductive layer. The mounting base 1 is typically at the ground potential of the device and will herein be referred to as the grounded base 1. The optical modulator has an optical modulator chip 2, for example a LiNbO$_3$ chip covered with an insulating buffer layer, mounted on the grounded base 1. The grounded base 1 includes input/output optical terminals 345 and input/output electrical terminals 71. The optical modulator chip 2 has two ground electrodes 3/3' and a signal electrode 4 mounted on top of the buffer layer above a waveguide 34 of the optical modulator chip 2. This electrode configuration is known as the coplanar-waveguide (CPW). When the electrode structure of the optical modulator chip 2 comprises just one signal electrode, and one ground plane, it is known as the coplanar-strips (CPS) configuration.

The optical modulator chip 2 is comprised of an active section 6 and non-active sections 5. The active section 6 of the device is the section of the optical modulator chip 2 wherein the electrical and optical signals interact to cause optical modulation. Typically, the electrode dimensions, such as the width of the signal electrode 4, and the electrode gap tend to be very narrow (5–25 microns) in the active section 6. These dimensions are prohibitively small to facilitate direct connection of the device to standard electrical connectors. Hence, the electrodes 3/4/3' for the active section 6 are flared 31/41/31' in the non-active section 5 to facilitate external connection to the signal electrode line 4 and the ground electrodes 3/3'. The flared electrodes 31/41/31' do not take part in the process of optical modulation, but are required to facilitate connection of the active section of the modulator to standard electrical interface media. External electrical connection to the flared electrodes 31/41/31' of the optical modulator chip 2 is facilitated by either a transition chip 7 having leads 23/24/23' connected to the flared electrodes 31/41/31' of the optical modulator chip 2 via wires or a direct external connection to the flared electrodes 31/41/31' of the optical modulator chip 2 via wires from the electrical terminals 71.

FIG. 2 illustrates a side view of the optical modulator in the direction shown as A—A in FIG. 1. FIG. 2 shows electrodes 31/41/31' on a buffer layer 8 terminating on the top surface edge of the optical modulator chip 2 and the grounded base 1 underlying the optical modulator chip 2. Although the ground electrodes 31/31' of FIGS. 1 and 2 are shown as single lines, the ground electrodes may be ground planes which cover most of the top surface of the optical modulator chip 2 except for the signal electrode 4 and an area just outside the signal electrode 4. For example, there can be ground planes that cover most of the top surface of the optical modulator chip 2 but are no closer to the signal electrode than the ground electrodes 3/3' shown.

The intended electrical guided mode for an optical modulator contains the frequency of an input or frequencies of input on the optical modulator for operating the optical modulator. Typically, an optical modulator has a range of sets of frequencies that can be used as electrical inputs to modulate an optical signal. For proper operation of the modulator, the intended electrical guided mode of the device must be such that the electric fields originating from the signal electrode must properly terminate on the adjacent ground electrodes without straying elsewhere in the modulator chip or package. The intended electrical guided mode of the optical modulator will hereinafter be referred to as the dominant CPW mode of the optical modulator.

Once the electric fields of the signal electrode penetrate through the buffer layer into the optical modulator chip, several other effects could occur. Depending on frequency, a CPW mode may couple with other extraneous electrical modes that the structure of the optical modulator can support. These modes could either be highly dispersive slab modes, or could be zero-cut-off modes. Examples of extraneous modes are: transverse-electric (TE) or transverse magnetic slab modes, slot-line mode (that could occur between the two ground planes of the CPW structure), parallel-plate modes (that could be excited between the electrodes on the top surface and the grounded base), and microstrip mode (between the top electrodes and the grounded base). When coupling to extraneous modes occurs, there is a loss of power for the dominant CPW mode. Such a power loss degrades the optical modulator's modulation performance and the clarity of the output modulated optical signal is degraded. The amount of power lost to spurious or other extraneous modes depends on the field overlap between the dominant CPW mode and the other extraneous modes supported by the device.

One approach to avoid coupling to spurious or other extraneous modes in CPW structures is by reducing the cross-sectional dimension of the CPW transmission line. Referring to FIG. 1, by decreasing (S+2D), which is the width of electrode 4 plus twice the distance that one of the optical modulator grounds 3/3' is located from the signal electrode 4, there is less field penetration into the optical modulator chip 2 and hence less of an opportunity for overlap between the guided CPW mode and other extraneous modes that can be supported by the device. Since there is less overlap in structures with smaller (S+2D), between the CPW mode and other extraneous modes, there is less of a power loss from the CPW mode and hence less degradation of the outputted modulated optical signal.

However, a CPW transmission line with a smaller cross-sectional dimension is not very practical because the device still requires external electrical connection. Typically, in the nonactive sections 5 of the optical modulator chip, the electrodes 3/4/3' for the active section 6 become respective flared electrodes 31/41/31' to facilitate connection to the signal electrode line and the ground electrodes. The connection is facilitated by the use of a transition chip 7 having leads connected to the flared electrodes 31/41/31' of the optical modulator chip 2 or a direct external connection to the flared electrodes 31/41/31' of the optical modulator chip 2. Although FIG. 1 shows two transition chips 7, a single transition chip for external connection to the optical modulator chip can extend down the side of the optical modulator chip and contain both sets of the electrodes 31/41/31'. Alternately, the modulator electrode can also be terminated with an appropriate resistance or a resistance-capacitance combination at the end of the electrode. Due to the relatively wider dimensions of the flared electrodes 31/41/31' in the non-active sections 5 compared to the electrodes 3/4/3' in the active section 6, there is significant field penetration into the optical modulator chip 2 (i.e. $LiNbO_3$) through the buffer layer 8 in the non-active sections 5. This penetration increases the opportunity for extraneous mode coupling into substrate slab modes or zero-cutoff modes that the structure (i.e. the optical modulator chip, the CPW transmission line and the grounded base) can support in both the active section 6 and non-active section 5.

Ground plane integrity between the ground and the signal electrode is important for satisfactory operation of the optical modulator. Otherwise, high-speed optical modulation in the active sections 6 of the optical modulator chip will be seriously hampered. This is because over the frequency range of interest, the electrical velocity and hence impedance varies at the input to the modulator (i.e. the flared electrodes), and coupling to spurious modes occurs. As a result, the optical modulation in the active section 6 will not be in concert with the inputted electrical signal to the optical modulator.

SUMMARY OF THE INVENTION

Accordingly, the present invention is directed to an optical modulator that substantially obviates one or more of the problems due to limitations and disadvantages of the related art.

The present invention provides an optical modulator with enhanced ground plane integrity to minimize loss of signal energy and to prevent the introduction of extraneous modes into the modulated optical signal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, an optical device of the present invention includes a grounded base; an optical modulator chip having a top surface, a back surface and side surfaces, wherein the optical modulator chip is positioned on the grounded base with the back surface of the optical modulator chip facing the grounded base; and a first ground electrode, a signal electrode and a second ground electrode located over the top surface of the optical modulator chip, wherein the first and second ground electrodes are respectively connected to first and second extended resistive electrodes that extend down at least one side of the optical modulator chip and connect to the grounded base.

In another aspect, an optical device of the present invention includes: a grounded base; a transition chip for interconnecting an optical modulator chip having a top surface, a back surface and side surfaces, wherein the transition chip is positioned on the grounded base with the back surface of the transition chip facing the grounded base; and a first ground connection lead, a signal connection lead and a second ground connection lead located over the top surface of the transition chip, wherein the first and second ground connection leads are interconnected to first and second extended resistive connection leads that extend down at least one side of the transition chip and connect to the grounded base.

In another aspect, an optical device of the present invention includes: a grounded base; an optical modulator chip positioned on the grounded base having a top surface, a back surface and side surfaces; a first ground electrode, a signal electrode and a second ground electrode located over the top surface of the optical modulator chip; a transition chip for interconnecting the optical modulator chip having a top surface, a back surface and side surfaces, wherein the transition chip is positioned on the grounded base with the back surface of the transition chip facing the grounded base; and a first ground connection lead, a signal connection lead and a second ground connection lead located on the top surface of the transition chip, wherein the first and second ground connection leads are connected to first and second extended resistive connection leads that extend down at least one side of the transition chip and connect to the grounded base.

In another aspect, an optical device of the present invention includes: a grounded base; an optical modulator chip having a top surface, a back surface and side surfaces, wherein the optical modulator chip is positioned on the grounded base with the back surface of the optical modulator chip facing the grounded base; at least one ground electrode and a signal electrode located over the top surface of the optical modulator chip, wherein the at least one ground electrode is connected to an extended resistive electrode that extends down one side of the optical modulator chip and connects to the grounded base; and a transition chip for interconnecting the optical modulator chip having a top surface, a back surface and side surfaces, wherein the transition chip is positioned on the grounded base with the back surface of the transition chip facing the grounded base.

BRIEF DESCRIPTION OF THE DRAWINGS

The accompanying drawings, which are included to provide a further understanding of the invention and are incorporated in and constitute a part of this specification, illustrate exemplary embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. The present invention is particularly useful in optical modulators and switches for optical telecommunications network systems that carry optical communications signals, such as wavelength division multiplexed (WDM) signals, over optical fibers.

Figure 1:
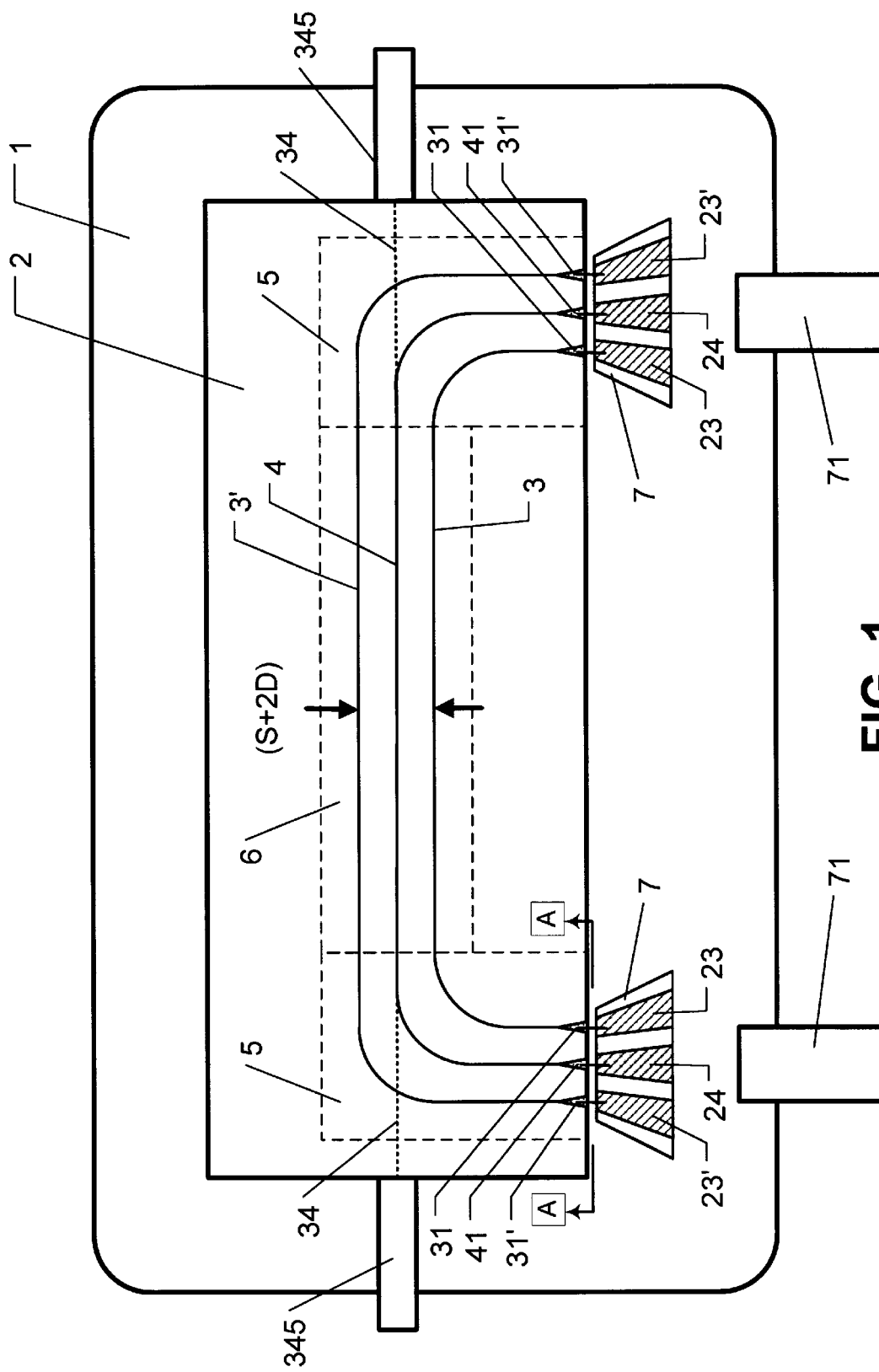
FIG. 1 shows a top view of a prior art optical modulation device.
Figure 2:
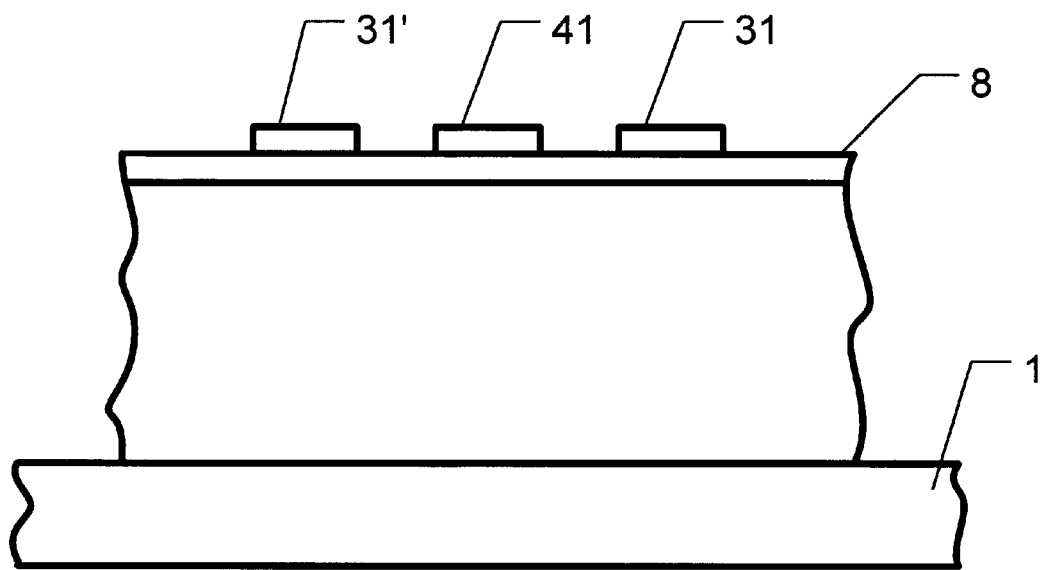
FIG. 2 shows the side view of prior art optical modulator chip electrodes 31/41/31' terminating on the top surface of the optical modulator chip.
Figure 3:
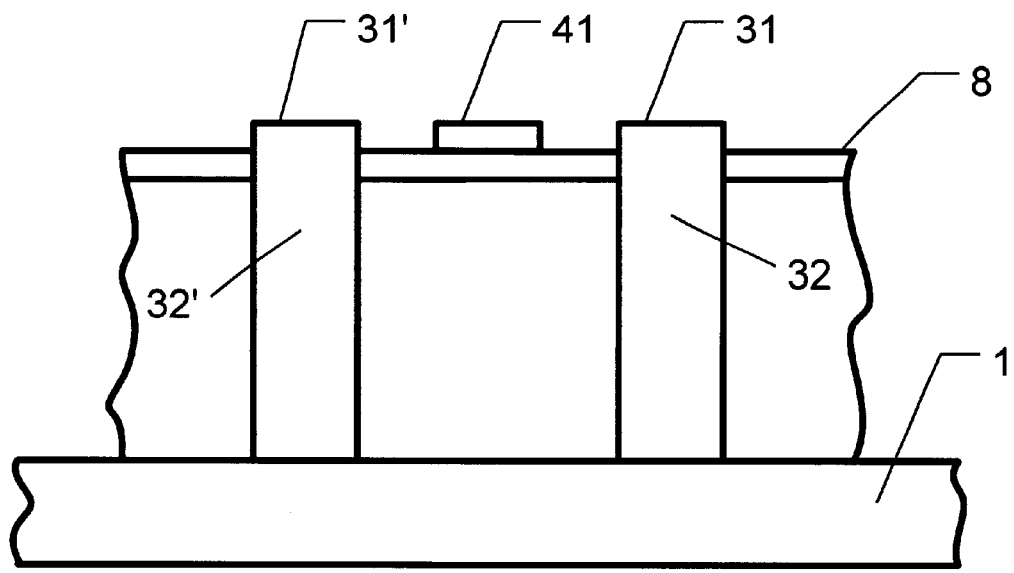
FIG. 3 shows a side view of an optical modulator chip on a grounded base illustrating a first exemplary embodiment of the present invention.

FIG. 3 illustrates a first exemplary embodiment of the invention, as incorporated into an optical modulation device like shown in FIG. 1, viewed in the direction A—A of FIG. 1. As shown in FIG. 3, the ground electrodes 31/31' of the optical modulator chip 2 are connected to extended resistive electrodes 32/32' that extend down the side surface of the optical modulator chip 2. FIG. 3 also shows the buffer layer 8 terminating at the edge of the top surface of the optical modulator chip 2. In the alternative, the buffer layer 8 may be omitted from the device. The extended resistive electrodes 32/32' contact the grounded base 1 near the back surface of the optical modulator chip 2. Therefore, the extended resistive electrodes 32/32' are connected by the grounded base 1 on the back surface of the optical modulator chip 2. In the alternative, the grounded base 1 can be close to the side surface of the optical modulator chip 2 shown in FIG. 3 as a result of the optical modulating chip residing in a well of the grounded base 1 with the lengths of sides of the extended resistive electrodes 32/32' along the sides of the optical modulator chip 2 directly in contact to the inner sidewall of the well in the grounded base.

Figure 4:
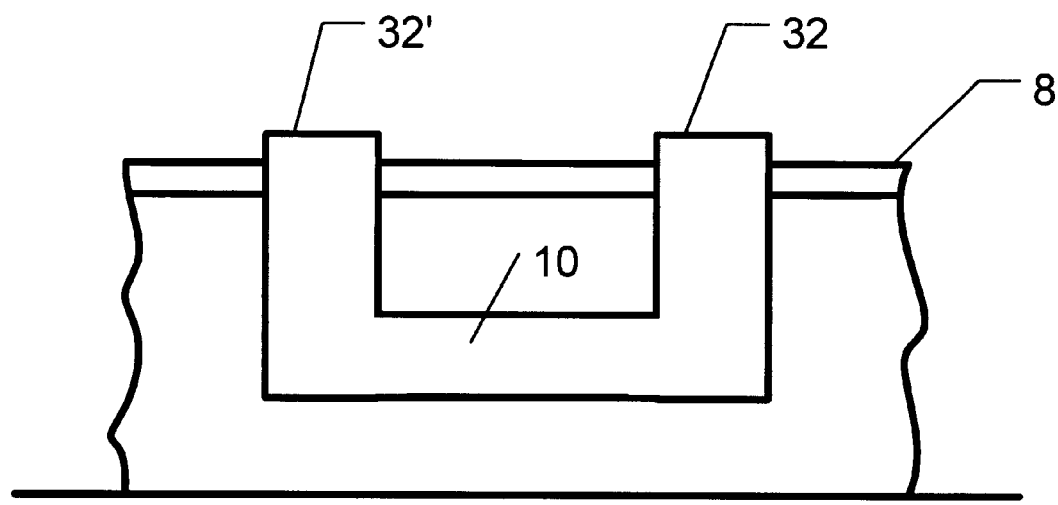
FIG. 4 shows a bottom view of an optical modulator chip on a grounded base illustrating a second exemplary embodiment of the present invention.

FIG. 4 illustrates a second exemplary embodiment of the invention, as incorporated into an optical modulation device like shown in FIG. 1, with a bottom view of the back surface of an optical modulator chip 2 which is the surface opposite to the surface having electrodes 31/41/31'. As shown in FIG. 4, the ground electrodes 31/31' are connected to extended resistive electrodes 32/32' that extend from the top surface of the optical modulator chip 2, across the side surface of the optical modulator chip 2 and onto the back surface of the optical modulator chip 2. The extended resistive electrodes 32/32' are interconnected together at a portion 10 on the back surface of the optical modulator chip and directly connected to the grounded base 1 which lies directly underneath the optical modulator chip 2. FIG. 4 also shows that the buffer layer 8 extends down the side surface of the optical modulator chip 2. In the alternative, the buffer layer 8 may be omitted from the side surface of the optical modulator chip 2 depending on the cut (i.e., z or x cut) of the optical modulator chip.

Figure 5:
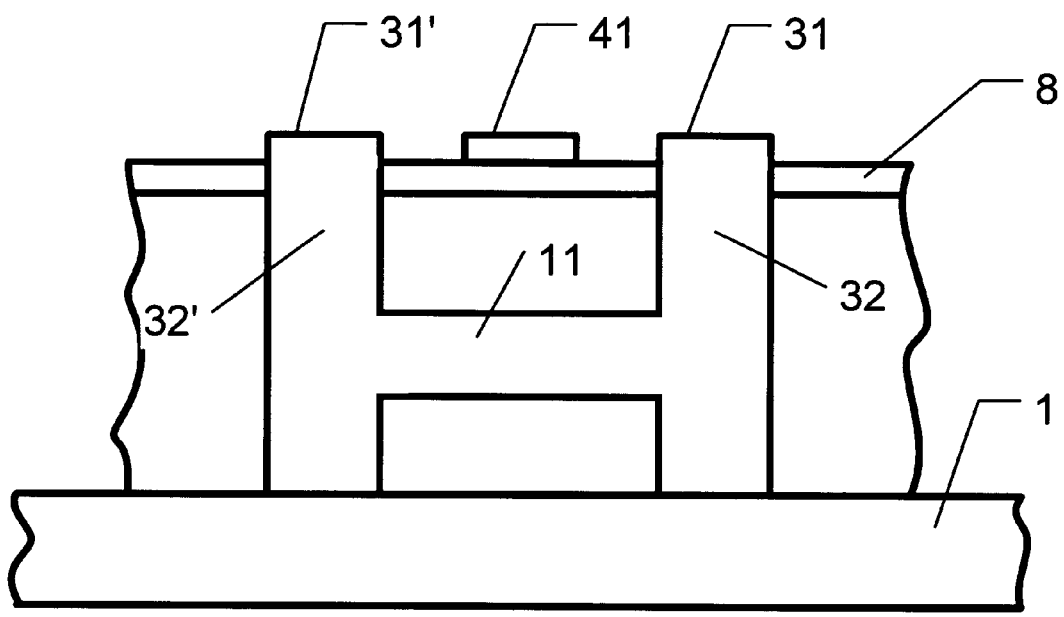
FIG. 5 shows a side view of an optical modulator chip illustrating a third exemplary embodiment of the present invention.

FIG. 5 illustrates a third exemplary embodiment of the invention, as incorporated into an optical modulation device like shown in FIG. 1, viewed in the direction A—A of FIG. 1. As shown in FIG. 3, the ground electrodes 31/31' of the optical modulator chip 2 connect to extended resistive electrodes 32/32' that extend down the side surface of the optical modulator chip 2 and contact the grounded base 1. In addition, as shown in FIG. 5, the extended resistive electrodes 32/32' are interconnected together at a portion 11 on the side surface of the optical modulator chip 2. In the alternative, the grounded base 1 can be close to the side surface of the chip shown in FIG. 5 as a result of the optical modulating chip residing in a well of the grounded base 1 with the lengths of sides of the extended resistive electrodes 32/32' along the sides of the optical modulator chip directly in contact to the inner sidewall of the well in the grounded base.

The extended resistive electrodes 32/32' in FIGS. 3, 4 and 5 and/or the interconnect 10/11 shown in FIGS. 4 and 5, can be comprised of several resistive coatings applied separately or just a singularly applied resistive coating. The resistive coating or coatings comprising the extended resistive electrodes 32/32' and/or interconnections 10/11 can be carbon-based, ceramic-based or thin film based resistors or other resistive means. For example, the coatings can be a carbon paint, Alumina or Silicon (either doped or undoped). In addition, the extended resistive electrodes and the interconnections can be comprised of the same resistive coating or different resistive coatings. By connecting the ground electrode or electrodes of a modulator to an extended resistive electrode or extended resistive electrodes that extend down the side surface of the optical modulator chip so as to connect to the grounded base and/or interconnect on a side of the optical modulator chip, the opportunity for extraneous mode coupling into parallel plate modes or other spurious modes is decreased.

In the alternative to the use of extended resistive electrodes on the optical modulator chip 2, the same advantages can be realized with a transition chip 7 having extended resistive connection leads, if a transition chip is used for interconnection to the optical modulator chip. However, a transition chip with extended resistive connection leads can also be used with a optical modulator chip having extended resistive electrodes. Furthermore, a conventional transition chip can be used with an optical modulator chip having extended resistive electrodes as described above.

Figure 6:
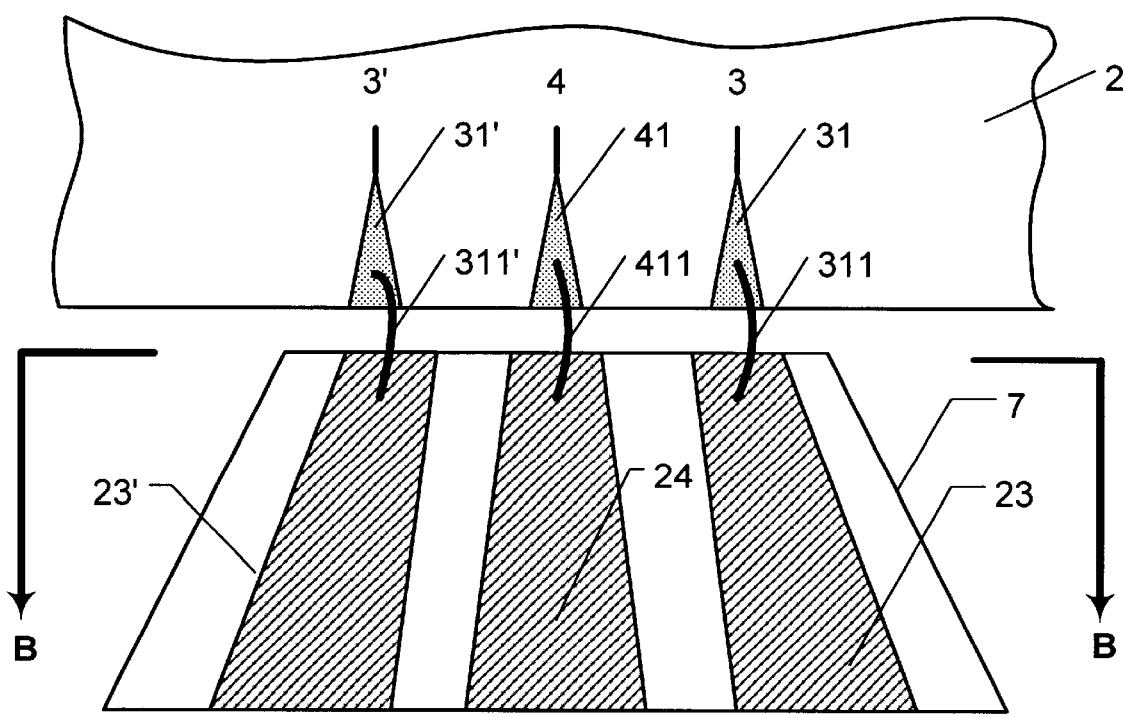
FIG. 6 illustrates a top view of a prior art device using a transition chip for interconnecting the optical modulator chip to external connections.

FIG. 6 discloses the prior art structure for connecting an optical modulating chip 2 with a transition chip 7. The transition chip 7 has a first ground connection lead 23, a signal connection lead 24 and a second ground connection lead 23' on the top surface of the transition chip 7. The ground connection leads 23/23' of the transition chip 7 are respectively connected to the flared ground electrodes 31/31' with wires 311/311' and the signal connection lead 24 of the transition chip 7 is connected to the flared signal electrode 41 with a wire 411.

Figure 7:
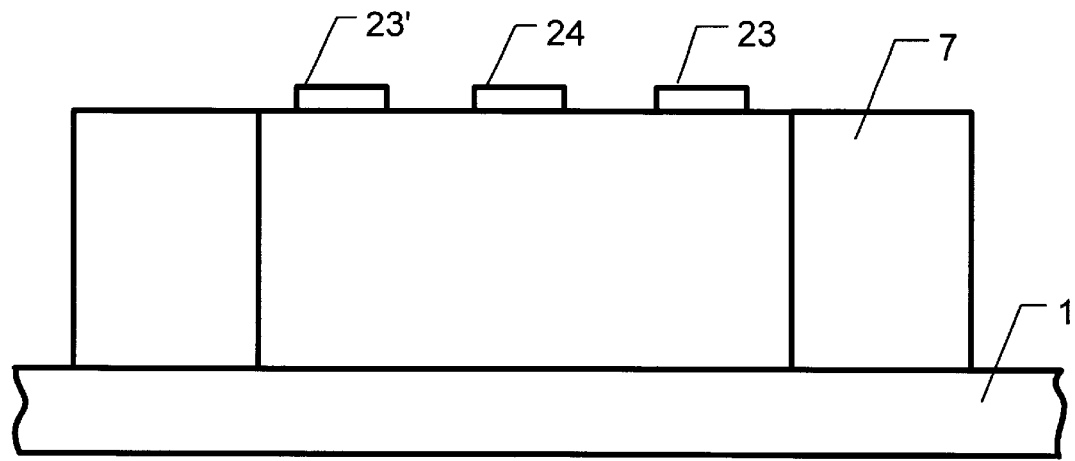
FIG. 7 illustrates a side view of prior art transition chip connection leads 23/24/23' terminating on the top surface of the transition chip.

FIG. 7 shows a side view of the transition chip 7 in the direction shown as B—B in FIG. 7. The prior art transition chip leads 23/24/23', as shown in FIG. 7, terminate at the edge of the transition chip 7. The body of the transition chip 7 is usually comprised of an insulating material. In addition or in the alternative to the first, second and third embodiments disclosed above in FIGS. 3, 4 and 5, the ground plane integrity can be enhanced by extending resistive connection leads down the side surfaces of the transition chips used for interconnection to an optical modulator.

Figure 8:
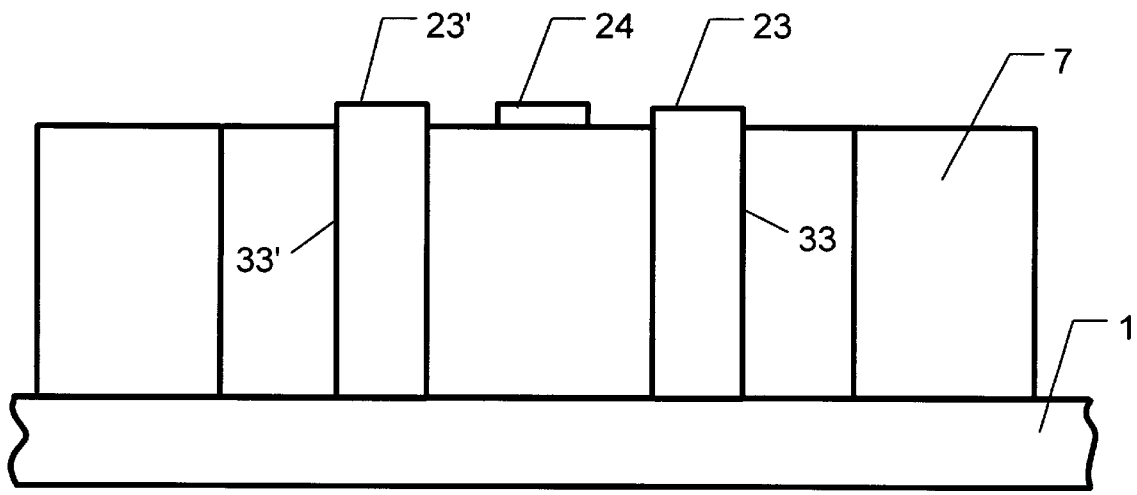
FIG. 8 shows a side view of a transition chip on a grounded base illustrating a fifth exemplary embodiment of the present invention.

FIG. 8 illustrates a fifth exemplary embodiment of the invention, as incorporated into an optical modulation device like shown in FIG. 6, viewed in the direction B—B of FIG. 6. As shown in FIG. 8, the ground connection leads 23/23' of the transition chip 2 are connected to extended resistive connection leads 33/33' that extend down the side surface of the transition chip 7. The extended resistive connection leads 33/33' contact the grounded base 1 near the back surface of the transition chip 7. Therefore, the extended resistive connection leads 33/33' are connected by the grounded base 1 on the back surface of the transition chip 7. In the alternative, the grounded base 1 can be close to the side surface of the transition chip 7 shown in FIG. 8 as a result of the transition chip residing in a well of the grounded base 1 with the lengths of sides of the extended resistive connection leads along the sides of the transition chip directly in contact to the inner sidewall of the well in the grounded base.

Figure 9:
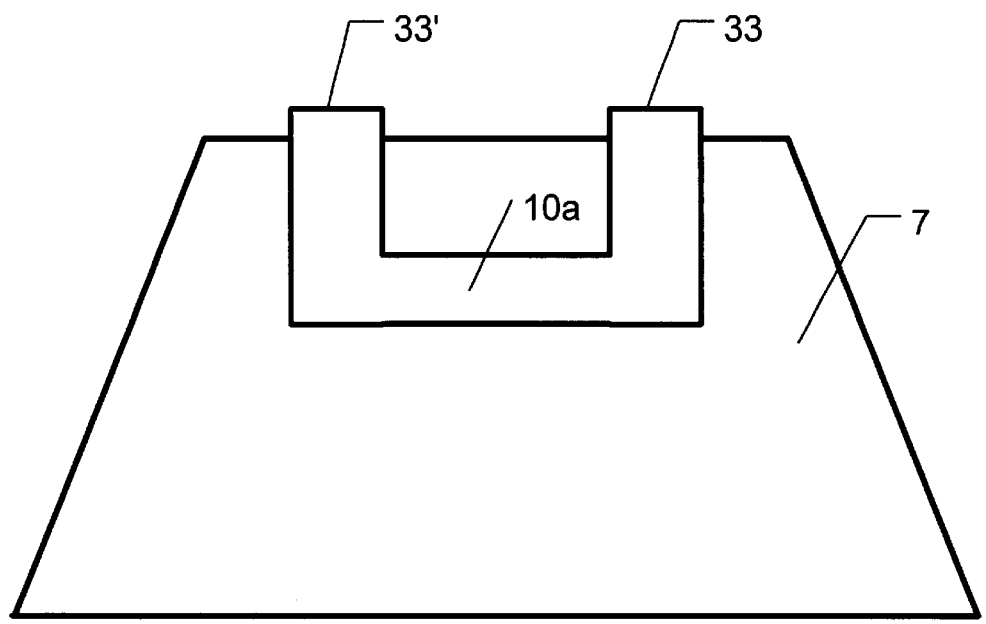
FIG. 9 illustrates a bottom view of a transition chip illustrating a sixth exemplary embodiment of the present invention.

FIG. 9 illustrates a sixth exemplary embodiment of the invention, as incorporated into an optical modulation device like shown in FIG. 6, with a bottom view of the back surface of a transition chip 7 which is the surface opposite to the surface having leads 23/24/23'. As shown in FIG. 9, the ground connection leads 23/23' on the top surface of the transition chip are connected to extended resistive connection leads 33/33' that extend across the side surface of the transition chip and onto the back surface of the transition chip 7. The extended resistive connection leads 33/33' are interconnected together at a portion 10a on the back surface of the transition chip 7 and connected to the grounded base 1 which lies beneath the transition chip 7.

Figure 10:
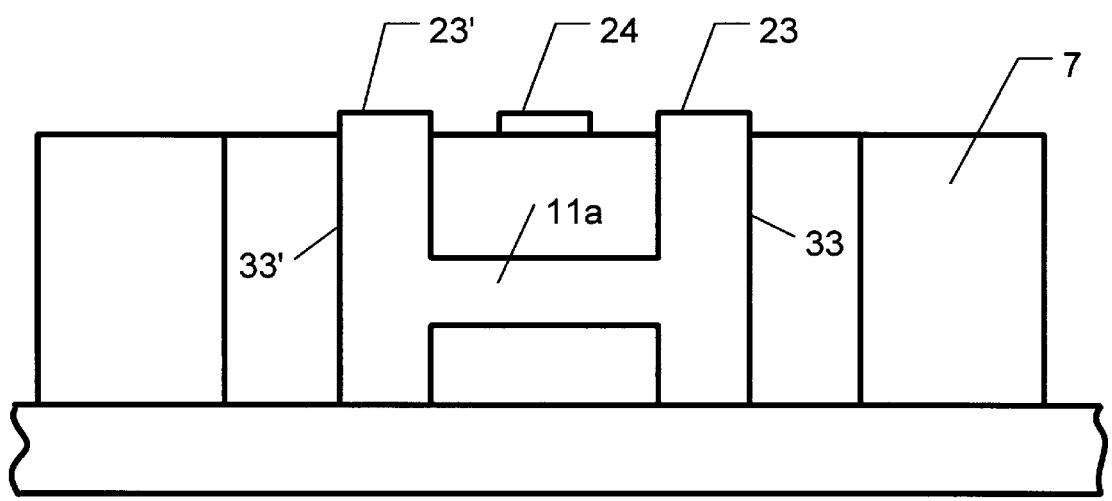
FIG. 10 shows a side view of a transition chip on a grounded base illustrating a seventh exemplary embodiment of the present invention.

FIG. 10 illustrates a seventh exemplary embodiment of the invention, as incorporated into an optical modulation device like shown in FIG. 6, viewed in the direction B—B of FIG. 6. As shown in FIG. 10, the ground connection leads 23/23' on the top surface of the transition chip 7 are connected to extended resistive connection leads 33/33' that extend across the side surface of the transition chip and are interconnected together at a portion 11a. The extended resistive connection leads 33/33' extend down the side surface of the transition chip to the bottom edge of the side surface in order to contact the grounded base 1. In the alternative, the grounded base 1 can be close to the side surface of the transition chip shown in FIG. 10 as a result of the transition chip residing in a well of the grounded base 1 with the lengths of sides of the extended resistive connection leads along the sides of the transition chip directly in contact to the inner sidewalls of the wells in the grounded base.

The extended resistive connection leads 33/33' in FIGS. 8, 9 and 10 and/or the interconnections 10a/11a shown in FIGS. 9 and 10, can be comprised of several resistive coatings applied separately or just a singularly applied resistive coating. The resistive coating or coatings comprising the extended resistive connection leads 33/33' and/or interconnections 10a/11a can be carbon-based, ceramic-based or thin film based resistors or other resistive means. For example, the coatings can be a carbon paint, Alumina or Silicon (either doped or undoped). In addition, the extended resistive connection leads 33/33' and the interconnections can be comprised of the same resistive coating or different resistive coatings. By connecting a ground connection lead to an extended resistive connection lead electrodes that extend down the side surface of the optical modulator chip so as to connect to the grounded base and/or interconnect to another extended resistive connection lead on a side of the optical modulator chip, the opportunity for extraneous mode coupling into parallel plate modes or other spurious modes is decreased.

Figure 11:
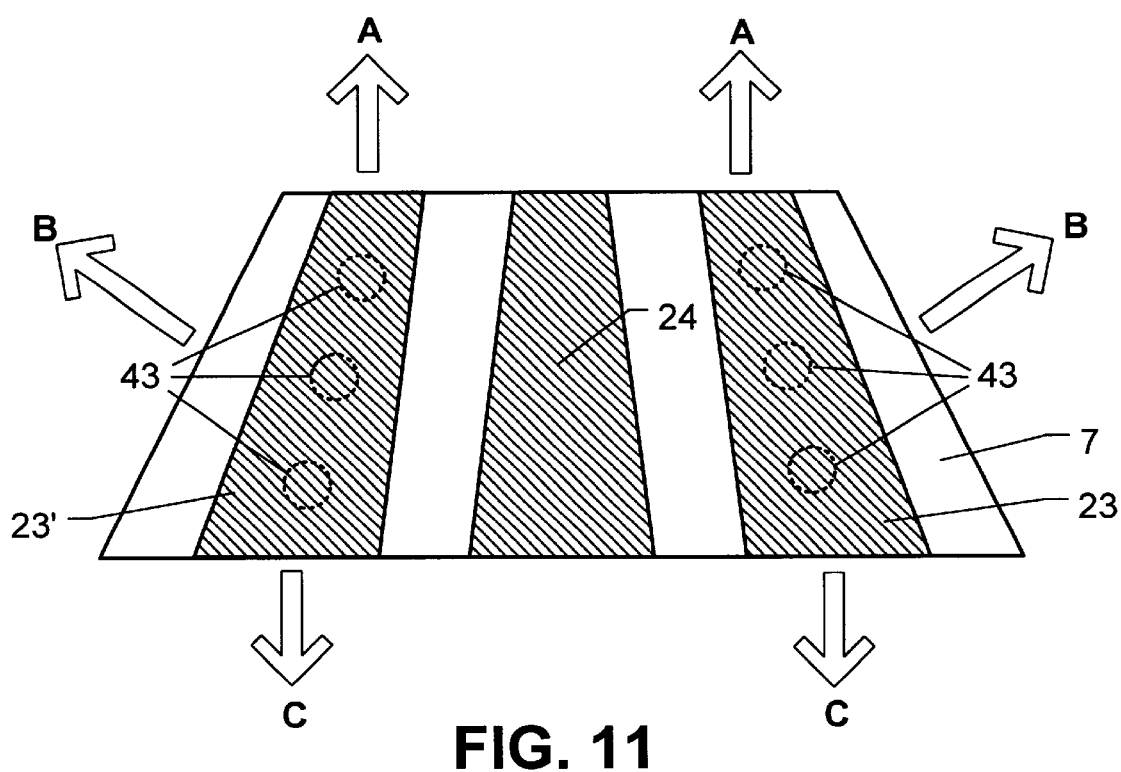
FIG. 11 illustrates three ways in which the ground connection leads can extend down sides of a transition chip in accordance with the present invention.

FIG. 11 illustrates other examples of how the ground connection leads 23/23' of the transition chip 7 can be interconnected by extended resistive connection leads 33/33' extending along side surface AA that would be next to the optical modulator chip 2, opposing side surfaces BB for interconnection on the back surface of the transition chip 7 or side surface CC near where the signal is initially inputted. FIG. 11 also illustrates how in the alternative or in addition to the extended resistive connection leads, resistive vias 43 can be formed in the transition chip 7 so as to connect the ground connection leads 23/23' to the grounded base underneath the transition chip 7 by resistive means going through the transition chip 7. There can be one or more resistive vias in the transition chip for each of the connection leads 23/23'. Although the transition chip 7 is shown as trapezoidal-shaped, the transition chip can be any polygonal shape that facilitates external interconnection to the optical modulator chip 2. Furthermore, instead of two transition chips being used to interconnect the optical modulator chip 2, a single transition chip that extends along the length of the optical modulator chip can be used for external interconnection to the optical modulator chip 2. When using a single transition chip, the extended ground connection leads will be on either or both of the sides like AA and CC in FIG. 11.

In addition, it is within the scope of the present invention, that side surfaces of both the optical modulator chip and the transition chip can have resistive extensions that are interconnected on the side surfaces of each respective chip and to one another. Also, both the optical modulator chip and the transition chip can have resistive extensions on side surfaces of the chips and on the back surfaces of the chips, wherein resistive extensions of each chip on the sides of each chip are interconnected.

Figure 12:
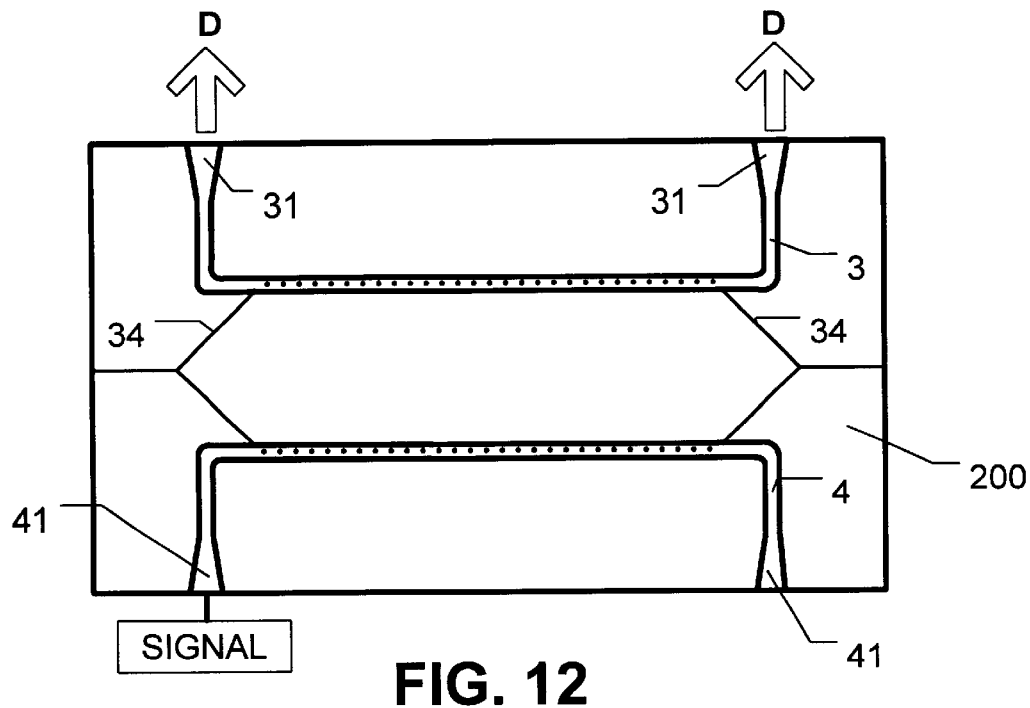
FIG. 12 illustrates a modulator device having only single ground electrode that can be modified in accordance with the present invention.

Furthermore, the present invention can be used in other types of modulator devices. For example, as shown in FIG. 12, a modulator device 200 having a single ground electrode 3 can have extended resistive electrodes extending down the side D that contact the grounded base underneath and may also be interconnected like the second and third embodiments. The device in FIG. 12 is a Mach-Zehnder interferometer with waveguide 34 and a signal electrode 4 with flared ends 41 in addition to the ground electrode 3 with flared ends 31. However, the present invention can be used in other single ground electrode modulators (e.g. phase shifters).

Figure 13:
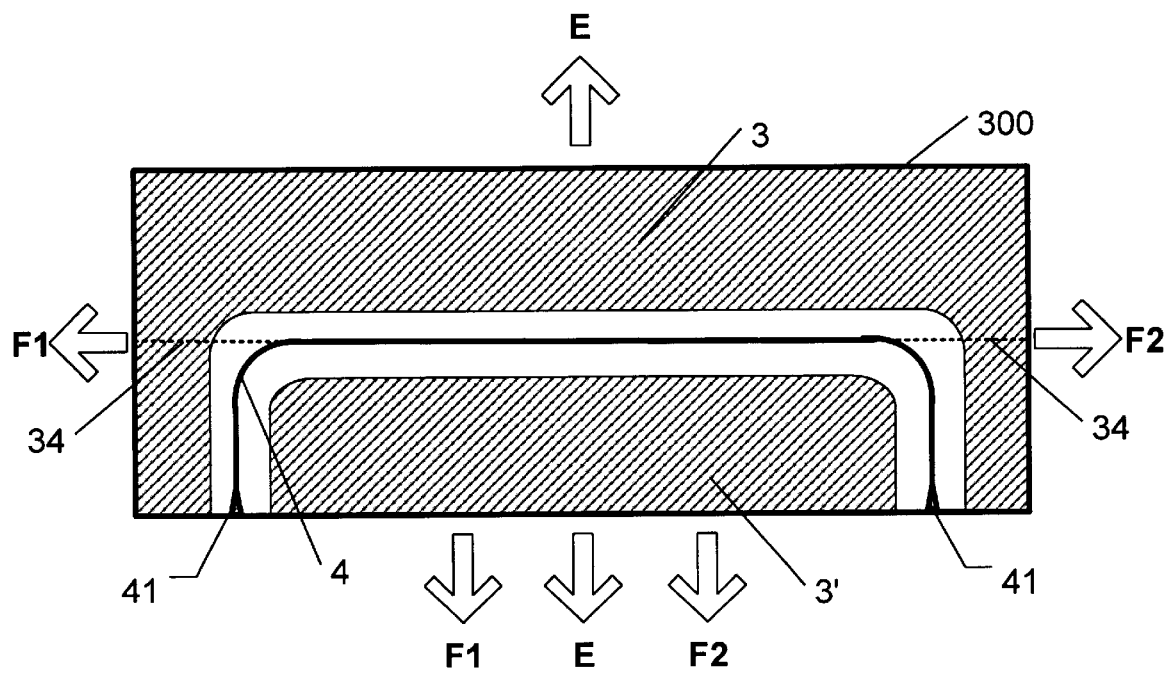
FIG. 13 illustrates a modulator device having planar ground electrodes that can be modified in accordance with the present invention.

FIG. 13 illustrates how the present invention can be used in a modulator device 300 having planar ground electrodes. The modulator device in FIG. 13 has a first planar ground electrode 3, a second planar ground electrode 3', a waveguide 34 and signal electrode 4 with flared ends 41. The planar ground electrodes 3/3' are connected to extended resistive electrodes extending down the sides as shown by E, down adjoining sides as shown by F1/F2, or down all four sides to contact the grounded base underneath. In addition, the extended resistive electrodes may also be interconnected like the second and third embodiments. It is also within the scope of the present invention that the exemplary embodiments can be used to modify optical modulators having more than two ground electrodes.

It will be apparent to those skilled in the art that various modifications and variations can be made in the optical modulator of the present invention without departing from the spirit or scope of the invention. Thus, it is intended that the present invention covers the modifications and variations of this invention provided they come within the scope of the appended claims and their equivalents.

What is claimed is:

1. An optical device comprising:
    a grounded base;
    an optical modulator chip having a top surface, a back surface and side surfaces, wherein the optical modulator chip is positioned on the grounded base with the back surface of the optical modulator chip facing the grounded base; and
    a first ground electrode, a signal electrode and a second ground electrode located over the top surface of the optical modulator chip, wherein the first and second ground electrodes are connected to first and second extended resistive electrodes that extend down at least one side of the optical modulator chip and are connected to the grounded base.

2. The optical device of claim 1, wherein the first and second extended resistive electrodes are connected to each other on the back surface of the optical modulator chip.

3. The optical device of claim 2, wherein the extended resistive electrodes and the connection of the extended resistive electrodes are comprised of a single layer of resistive material.

4. The optical device of claim 1, wherein lengths of the extended resistive electrodes on a side of the optical modulator chip abut against the grounded base as a result of the optical modulator chip residing in a well within the grounded base.

5. The optical device of claim 2, wherein the extended resistive electrodes and the connection of the extended resistive electrodes are comprised of carbon-based, ceramic-based or thin film based resistive materials.

6. The optical device of claim 1, wherein the first and second extended resistive electrodes are connected to each other on a side surface of the optical modulator chip.

7. The optical device of claim 6, wherein the extended resistive electrodes and the connection of the extended ground electrodes are comprised of a single layer of resistive material.

8. The optical device of claim 6, wherein the extended resistive electrodes and the connection of the extended ground electrodes are comprised of different layers of resistive material.

9. The optical device of claim 1, wherein an insulating buffer layer is on the top and side surfaces between the electrodes and the optical modulator chip.

10. An optical device comprising:
    a grounded base;
    a transition chip for interconnecting an optical modulator chip having a top surface, a back surface and side surfaces, wherein the transition chip is positioned on the grounded base with the back surface of the transition chip facing the grounded base; and
    a first ground connection lead, a signal connection lead and a second ground connection lead located over the top surface of the transition chip, wherein the first and second ground connection leads are interconnected to first and second extended resistive connection leads that extend down at least one side of the transition chip and are connected to the grounded base.

11. The optical device of claim 10, wherein the first and second extended ground connection leads are comprised of a single layer of resistive material.

12. The optical device of claim 11, wherein the extended resistive connection leads and the interconnection of the extended resistive connection leads are comprised of carbon-based, ceramic-based or thin film-based resistive materials.

13. The optical device of claim 10, wherein lengths of the extended resistive connection leads on a side of the transition chip abut against the grounded base as a result of the transition chip residing in a well within the grounded base.

14. The optical device of claim 10, wherein the extended resistive connection leads and the interconnection of the extended ground connection leads are comprised of different layers of resistive material.

15. The optical device of claim 10, wherein only one transition chip runs along a side of the optical modulator and is used for external interconnection to the optical modulator chip.

16. The optical device of claim 10, wherein the first and second extended resistive connection leads extend down opposing side surfaces of the transition chip.

17. The optical device of claim 10, wherein resistive vias interconnect the ground connection leads to the grounded base through the transition chip.

18. An optical device comprising:
    a grounded base;
    an optical modulator chip positioned on the grounded base having a top surface, a back surface and side surfaces;
    a first ground electrode, a signal electrode and a second ground electrode located over the top surface of the optical modulator chip;
    a transition chip for interconnecting the optical modulator chip to external connections having a top surface, a back surface and side surfaces, wherein the transition chip is positioned on the grounded base with the back surface of the transition chip facing the grounded base; and
    a first ground connection lead, a signal connection lead and a second ground connection lead located on the top surface of the transition chip, wherein the first and second ground connection leads are connected to first and second extended resistive connection leads that extend down at least one side of the transition chip and are connected to the grounded base.

19. The optical device of claim 18, wherein the first and second ground electrodes are connected to first and second extended resistive electrodes that extend down at least one side of the optical modulator chip and are connected to the grounded base.

20. The optical device of claim 19, wherein the first and second extended resistive electrodes are connected to each other on the back surface of the optical modulator chip.

21. The optical device of claim 18, wherein the first and second extended resistive connection leads are connected to each other on the back surface of the transition chip.

22. The optical device of claim 20, wherein the extended resistive electrodes and the connection of the extended resistive electrodes are comprised of a single layer of resistive material.

23. The optical device of claim 21, wherein the extended resistive connection leads and connection of the extended resistive connection leads are comprised of a single layer of resistive material.

24. An optical device comprising:

a grounded base;

an optical modulator chip having a top surface, a back surface and side surfaces, wherein the optical modulator chip is positioned on the grounded base with the back surface of the optical modulator chip facing the grounded base;

at least one ground electrode and a signal electrode located over the top surface of the optical modulator chip, wherein the at least one ground electrode is connected to an extended resistive electrode that extends down one side of the optical modulator chip and is connected to the grounded base;

a transition chip for interconnecting the optical modulator chip having a top surface, a back surface and side surfaces, wherein the transition chip is positioned on the grounded base with the back surface of the transition chip facing the grounded base; and at least one connection lead located on the top surface of the transition chip.

25. The optical device of claim 24, wherein the at least one ground electrode is a planar electrode.

26. The optical device of claim 24, wherein the at least one ground electrode is comprised of two or more ground electrodes each being connected to extended resistive electrodes that are connected to the grounded base.

27. The optical device of claim 26, wherein the extended resistive electrodes are connected to each other on a side of the optical modulator chip.

28. The optical device of claim 26, wherein the extended resistive electrodes are connected to each other on the back surface of the optical modulator chip.

29. The optical device of claim 26, wherein the extended ground electrodes extend down different sides of the optical modulator chip.

30. The optical device of claim 24, wherein more than one extended resistive electrode is connected to a ground electrode.

31. The optical device of claim 30, wherein the extended resistive electrodes extend down different sides of the optical modulator chip.

32. An optical device comprising:

a grounded base;

an optical modulator chip having a top surface, a back surface and side surfaces, wherein the optical modulator chip is positioned on the grounded base with the back surface of the optical modulator chip facing the grounded base;

at least one ground electrode and a signal electrode located over the top surface of the optical modulator chip;

a transition chip for interconnecting the optical modulator chip having a top surface, a back surface and side surfaces, wherein the transition chip is positioned on the grounded base with the back surface of the transition chip facing the grounded base; and at least one connection lead located on the top surface of the transition chip, wherein a resistive via through the transition chip interconnects the at least one ground connection lead with the grounded base.

33. The optical device according to claim 32, wherein there are one or more conductive vias for each connection lead.

34. An optical device comprising:

a grounded base on which an optical modulator chip is positioned;

a first ground electrode, a signal electrode and a second ground electrode located on the optical modulator chip; and wherein the first and second ground electrodes are connected to each other and the grounded base with resistive electrodes on a side of the optical modulator chip.

35. An optical device comprising:

a grounded base on which an optical modulator chip is positioned;

a first ground electrode, a signal electrode and a second ground electrode located on the optical modulator chip;

a transition chip having a first connection lead connected to the first ground electrode, a signal connection lead connected to the signal electrode and a second connection lead connected to the second ground electrode; and wherein the first and second connection leads are connected to each other and the grounded base with resistive connection leads on a side of the transition chip.

* * * * *